United States Patent [19]

Tachibana et al.

[11] Patent Number: 5,284,741
[45] Date of Patent: Feb. 8, 1994

[54] ANTISTATIC LAYER

[75] Inventors: Noriki Tachibana; Yoichi Saito, both of Hino, Japan

[73] Assignee: Konica Corporation, Tokyo, Japan

[21] Appl. No.: 59,881

[22] Filed: May 7, 1993

Related U.S. Application Data

[63] Continuation of Ser. No. 935,648, Aug. 26, 1992, abandoned, which is a continuation of Ser. No. 797,148, Nov. 22, 1991, abandoned, which is a continuation of Ser. No. 613,154, Nov. 9, 1990, abandoned.

[30] Foreign Application Priority Data

Dec. 11, 1989 [JP] Japan .................................. 1-319770

[51] Int. Cl.$^5$ .............................................. G03C 1/25
[52] U.S. Cl. ..................................... 430/529; 428/515; 430/523
[58] Field of Search ............... 428/515, 523, 527, 529, 428/621

[56] References Cited

U.S. PATENT DOCUMENTS

| | | |
|---|---|---|
| 3,507,837 | 4/1970 | Hidinger . |
| 3,997,701 | 12/1976 | Ealding et al. . |
| 4,147,550 | 4/1979 | Campbell et al. .................. 430/529 |
| 4,192,682 | 3/1980 | Sakamoto et al. . |
| 4,303,505 | 11/1981 | Heberger . |
| 4,595,730 | 4/1986 | Cho ..................................... 430/529 |
| 4,725,665 | 9/1980 | Schadt ................................ 430/529 |

OTHER PUBLICATIONS

Research Disclosure No. 195, Jul. 1980, Havant GB pp. 301–310; Anonymous: "Photographic applications of latices"* p. 305, column 1 *.

*Primary Examiner*—Jack P. Brammer
*Attorney, Agent, or Firm*—Frishauf, Holtz, Goodman & Woodward

[57] ABSTRACT

Disclosed is an antistatic layer for a plastic film comprising a reaction product of a polystyrenesulfonic acid type water-soluble conductive polymer, amide group-containing hydrophobic polymer particles and a curing agent.

12 Claims, No Drawings

ANTISTATIC LAYER

This application is a continuation of application Ser. No. 07/935,648, filed Aug. 26, 1992, which is a continuation of application Ser. No. 07/797,148 filed Nov. 22, 1991, which is a continuation of Ser. No. 07/613,154 filed Nov. 9, 1990.

BACKGROUND OF THE INVENTION

This invention relates to an antistatic layer for a plastic film, particularly to a light-sensitive silver halide photographic material excellent in antistatic ability.

Generally speaking, plastic films have strong chargeability, which gives many restrictions in uses in many examples. For example, in light-sensitive silver halide photographic materials, supports such as polyethylene terephthalate have been generally used, which are liable to be charged particularly at lower humidity during winter season. In recent days, when high sensitivity photographic emulsions are coated at high speed, or light-sensitive materials of high sensitivity are subjected to exposure treatment through an automatic printer, antistatic countermeasures are particularly important.

When a light-sensitive material is charged, static marks may appear by its discharging, or a foreign matter such as dust may be attached, whereby pinholes may be generated to deteriorate quality markedly and workability is lowered extremely for correction thereof. For this reason, surfactants or polymeric compounds containing polyethylene oxide groups, polymers containing sulfonic acid or phosphoric acid groups in the molecule have been employed.

Particularly, chargeability control with a fluorine-containing surfactant or conductivity improvement with a conductive polymer has been frequently used and, for example, in Japanese Unexamined Patent Publications No. 91165/1974 and No. 121523/1974, examples of applying an ion type polymer having dissociable group in the polymer main chain are disclosed.

However, in these prior art techniques, the antistatic ability will be deteriorated to a great extent by developing processing. This may be considered to be due to the fact that the antistatic ability is lost via the steps such as the developing step using an alkali, the acidic fixing step and the step of washing. Therefore, in the case when printing is conducted by further using a treated film as in a printing light-sensitive material, the problems such as pinhole generation by attachment of dust will ensue. For this reason, for example, in Japanese Unexamined Patent Publications No. 84658/1980 and No. 174542/1986, antistatic layers comprising a water-soluble conductive polymer having carboxyl groups, a hydrophobic polymer having carboxyl groups and a polyfunctional aziridine have been proposed. According to this method, antistatic ability can remain after the treatment, but since transparency of the coated film depends greatly on the drying speed, there was involved the drawback that transparency was lowered to a level which could not stand use at all when drying was effected quickly for improvement of production efficiency, even though it might be transparent when drying was effected slowly.

SUMMARY OF THE INVENTION

To cope with the problems as described above an object of the present invention is to provide an antistatic layer for a plastic film excellent in transparency without haze even when dried quickly, and also without deterioration of antistatic ability after processing such as developing processing, and another object of the present invention is to provide a light-sensitive silver halide photographic material excellent in antistatic ability.

The above objects of the present invention can be accomplished by an antistatic layer for a plastic film comprising a reaction product of a polystyrenesulfonic acid type water-soluble conductive polymer, amide group-containing hydrophobic polymer particles and a curing agent.

DESCRIPTION OF THE PREFERRED EMBODIMENTS

In the following, the present invention is explained in more detail.

In the water-soluble conductive polymer of the present invention, a recurring unit of styrenesulfonic acid is required to be contained. The styrenesulfonic acid group is required to be 5% by weight or more per one molecule of the polymer. In the water-soluble conductive polymer, at least one of a hydroxy group, an amino group, an epoxy group, an aziridine group, an active methylene group, a sulfinic acid group, an aldehyde group and a vinylsulfone group may be contained.

The conductive polymer can be obtained by sulfonation of polystyrene derivatives or polymerization of styrene-sulfonic acids.

The polymer may have a molecular weight (Mn) of 3,000 to 100,000, preferably 3,500 to 50,000.

In the following, exemplary compounds of the water-soluble conductive polymers to be used in the present invention are set forth, but the present invention is not limited by these examples at all.

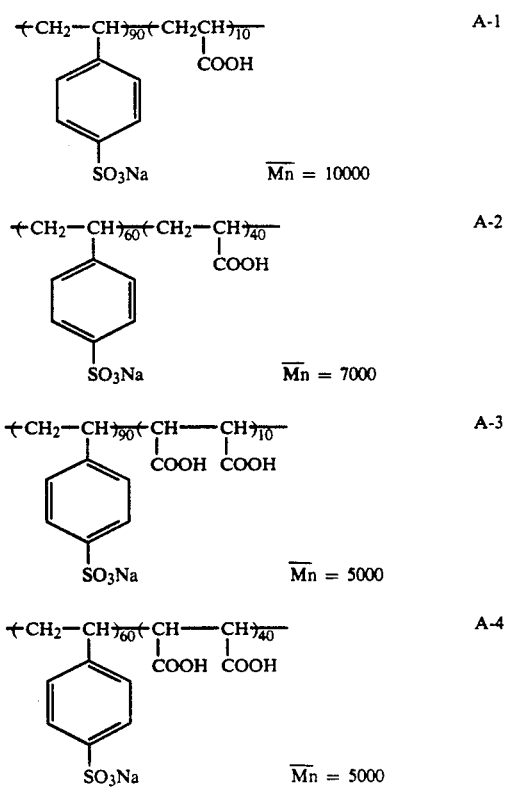

-continued

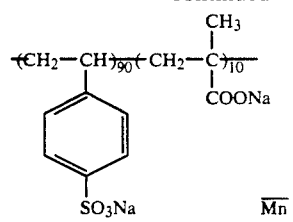
$\overline{Mn} = 20000$
A-5

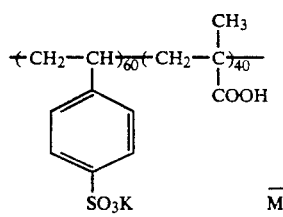
$\overline{MN} = 8000$
A-6

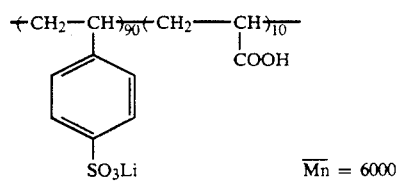
$\overline{Mn} = 6000$
A-7

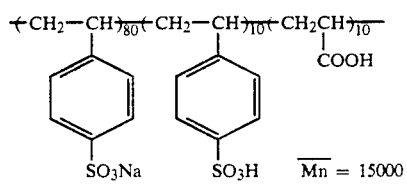
$\overline{Mn} = 15000$
A-8

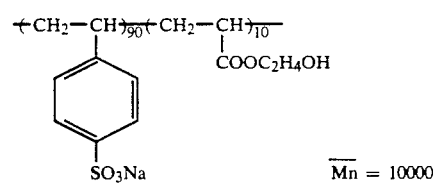
$\overline{Mn} = 10000$
A-9

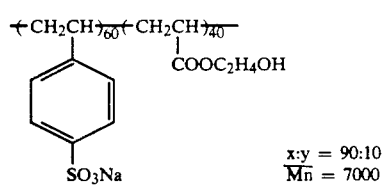
x:y = 90:10
$\overline{Mn} = 7000$
A-10

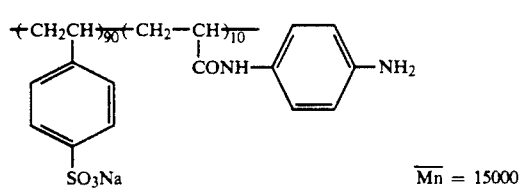
$\overline{Mn} = 15000$
A-11

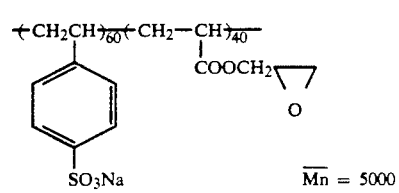
$\overline{Mn} = 5000$
A-12

-continued

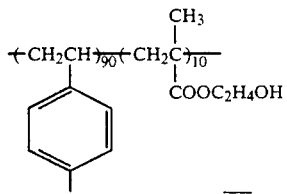
$\overline{Mn} = 20000$
A-13

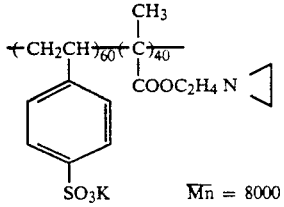
$\overline{Mn} = 8000$
A-14

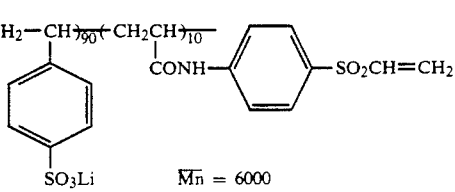
$\overline{Mn} = 6000$
A-15

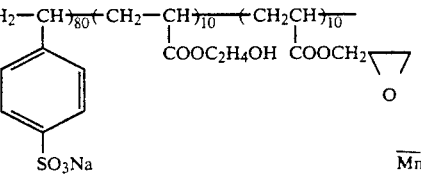
$\overline{Mn} = 15000$
A-16

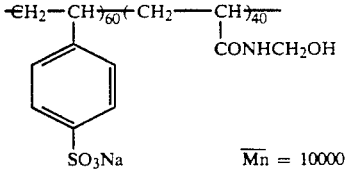
$\overline{Mn} = 10000$
A-17

In the above formulae A-1 to A-17, Mn represents an average molecular weight (in the present specification, average molecular weight refers to number average molecular weight), which is a measured value according to GPC represented by polyethylene glycol.

The hydrophobic polymer particles to be contained in the water-soluble conductive polymer layer of the present invention are composed of the so-called latex substantially insoluble in water. The hydrophobic polymer can be obtained by polymerization of monomers according to any desired combination selected from among styrene, styrene derivatives, alkyl acrylates, alkyl methacrylates, olefin derivatives, halogenated ethylene derivatives, vinyl ester derivatives and acrylonitrile. Particularly, those containing 30 mole % or more of styrene derivatives, alkyl acrylates and alkyl methacrylates are preferred, particularly preferably 50 mole % or more.

As the monomer having an amide group to be contained in the latex of the present invention, those represented by the following formula (I) are preferred.

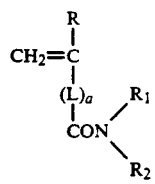 (I)

wherein R represents a hydrogen atom, a lower alkyl group having 1 to 4 carbon atoms; L represents a divalent group; a represents 0 or 1; and $R_1$ and $R_2$ each represent a hydrogen atom or a lower alkyl group having 1 to 6 carbon atoms.

In the following, specific examples of the monomer of the present invention are enumerated.

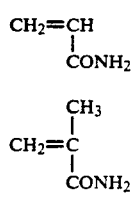
1.
2.

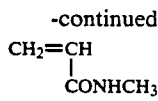
3.

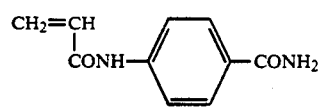
4.

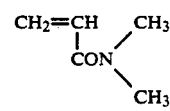
5.

For making the hydrophobic polymer into the form of a latex, there are two methods, one of which is performing emulsion polymerization and the other is dissolving the polymer in solid state into a low boiling point solvent to be finely dispersed therein, followed by evaporation of the solvent, but the emulsion polymerization method is preferred in the points of fine particle size, and yet with regular sizes.

The mplecular weight of the hydrophobic polymer may be 3,000 or higher, and there is no substantial difference in transparency depending on the molecular weight.

Specific examples of the hydrophobic polymer of the present invention are shown below.

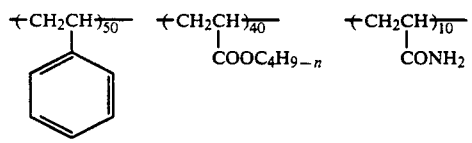 B-1

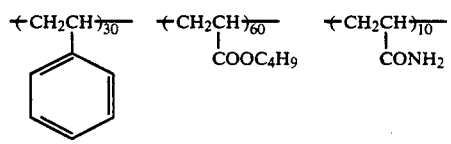 B-2

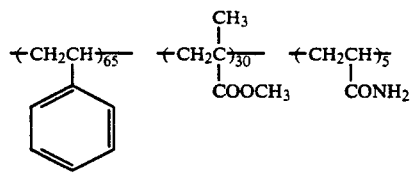 B-3

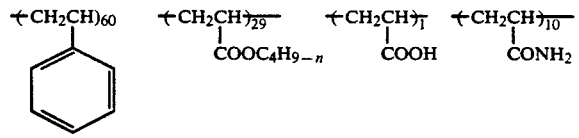 B-4

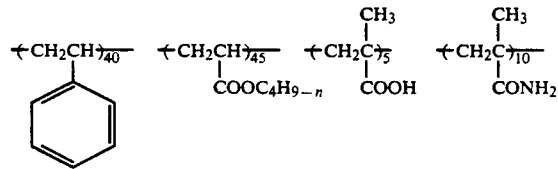 B-5

-continued

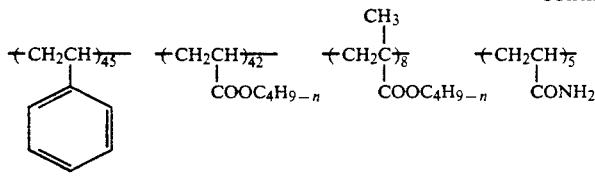
B-6

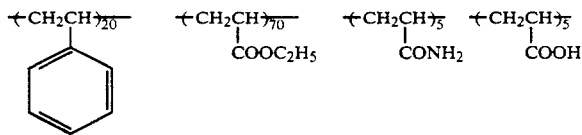
B-7

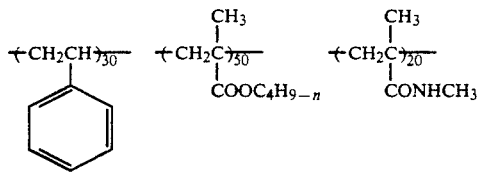
B-8

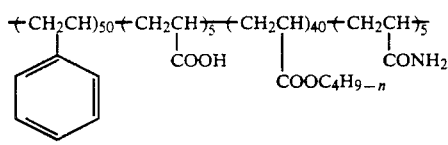
B-9

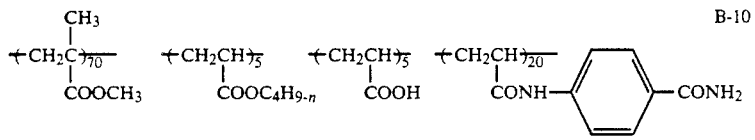
B-10

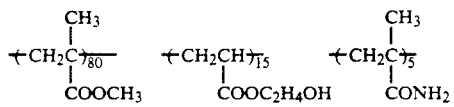
B-11

In the present invention, a constitutional ratio of the water-soluble conductive polymer, the hydrophobic polymer particle and the curing agent is preferably, in terms of % by weight, 50 to 95:5 to 45:1 to 45, particularly preferably 60 to 90:10 to 40:5 to 30.

The water-soluble conductive polyer is contained in the antistatic layer preferably in an amount of 0.01 to 10 g/m², more preferably 0.5 to 2.5 g/m².

A coated film thickness of the antistatic layer according to the present invention is in dried state 0.4 to 2.5 μm, particularly preferably 0.5 to 2.0 μm. If it is less than 0.4 μm, sufficient conductivity cannot be obtained after developing processing, while when attempting to make the film more than 2.5 μm, coating processing is extremely difficult and a coated film having good surface smoothness cannot be obtained.

In the present invention, a pH of the surface of the coated antistatic layer after drying is preferably made 8.5 or less. As the method therefor, it is preferred to use and coat an aqueous processing solution to which an acid or a salt is added. As the salt, preferred are those of a strong acid and a weak base such as ammonium sulfate, ammonium phosphate, ammonium hydrogen phosphate, ammonium dihydrogen phosphate, ammonium chloride, ammonium lactate and ammonium citrate. As the weak base, ammonia is particularly preferred.

The amount of the salt to be added is preferably 0.1 to 20 % by weight, more preferably 1 to 10% by weight, based on the conductive polymer.

The pH of the film surface is preferably 8.0 or less, but too low pH value is not preferred in the point of stability of the film. The pH of 3.0 to 7.5 is particularly preferred.

The curing agent for curing the conductive layer of the present invention may be preferably a polyfunctional aziridine compound. The aziridine compound may be preferably bifunctional or trifunctional, with a molecular weight of 7,000 or lower.

The conductive layer of the present invention may be on the support side relative to the light-sensitive layer, or on the side opposite to the light-sensitive layer of the support, namely the back surface.

In the present invention, the conductive layer is provided on a transparent support by coating. As the transparent support, all supports for photography can be used, but preferably polyethylene terephthalate or cellulose triacetate prepared so as to transmit 90% or more of visible light.

These transparent supports can be prepared by the methods well known to those skilled in the art, but in some cases, a dye may be slightly added to give slight blue tint substantially without interfering with light transmission.

The support of the present invention may also have a subbing layer containing a latex polymer provided by coating after corona discharging treatment. The corona discharging treatment may be applied particularly preferably at 1 mW to 1 KW/m²·min as the energy value.

Also, particularly preferably, corona discharging treatment is effected again before coating of the conductive layer after coating of the latex subbing layer.

The present invention can be applied to substantially all light-sensitive materials formed on supports. For example, they are light-sensitive silver halide color materials, light-sensitive materials for roentgenogram and light-sensitive materials for printing plates.

The silver halide emulsion to be used in the present invention can be stabilized by using the compounds as disclosed in U.S. Pat. Nos. 2,444,607, No. 2,716,062 and No. 3,512,982, West German Patent Publications No. 1,189,380, No. 2,058,626 and No. 2,118,411, Japanese Patent Publication No. 4133/1968, U.S. Pat. No. 3,342,596, Japanese Patent Publication No. 4417/1972, West German Patent Publication No. 2,149,789, Japanese Patent Publications No. 2825/1964 and No. 13566/1974, preferably, for example, 5,6-trimethylene-7-hydroxy-S-triazolo(1,5-a)pyrimidine, 5,6-tetramethylene-7-hydroxy-S-triazolo(1,5-a)pyrimidine, 5-methyl-7-hydroxy-S-triazolo(1,5-a)pyrimidine, 7-hydroxy-S-triazolo(1,5-a)pyrimidine, 5-methyl-6-bromo-7-hydroxy-S-triazolo(1,5-a)pyrimidine, gallic acid esters (e.g. isoamyl gallate, dodecyl gallate, propyl gallate and sodium gallate), mercaptans (1-phenyl-5-mercaptotetrazole and 2-mercaptobenzthiazole), benzotri-azoles (5-bromobenzotriazole, 5-methylbenzotriazole) and benzimidazoles (6-nitrobenzimidazole).

In the light-sensitive silver halide photographic material according to the present invention and/or the developing solution, an amino compound can be contained.

For enhancing developability, a developing agent such as phenidone or hydroquinone, or an inhibitor such as benzotriazole can be contained on the emulsion side. Alternatively, for enhancing the processing ability of the processing solution, a developing agent or an inhibitor can be contained in the backing layer.

The hydrophilic colloid to be used particularly advantageously in the prevent invention is gelatin.

The gelatin to be used in the present invention may include both of alkali treated and acid treated gelatins. However, when osscein gelatin is used, it is preferred to remove calcium or iron. The content of calcium may be preferably 1 to 999 ppm, more preferably 1 to 500 ppm, and the content of iron may be preferably 0.01 to 50 ppm, more preferably 0.1 to 10 ppm. A method for thus controlling the amount of calcium or iron can be accomplished by passing an aqueous gelatin solution through an ion exchange device.

The developing agent to be used for development of the light-sensitive silver halide photographic material according to the present invention may include catechol, pyrogallol and derivatives thereof, and ascorbic acid, chlorohydroquinone, bromohydroquinone, methylhydroquinone, 2,3-dibromohydroquinone, 2,5-diethylhydroquinone, 4-chlorocatechol, 4-phenyl-catechol, 3-methoxy-catechol, 4-acetyl-pyrogallol and sodium ascorbate.

Also, $HO-(CH=CH)_n-NH_2$ type developer may typically include o- and p-aminophenols, and specifically includes 4-aminophenol, 2-amino-6-phenylphenol, 2-amino-4-chloro-6-phenylphenol and N-methyl-p-aminophenol.

Further, examples of $H_2N-(CH=CH)_n-NH_2$ type developer may include 4-amino-2-methyl-N,N-diethylaniline, 2,4-diamino-N,N-diethylaniline, N-(4-amino-3-methylphenyl)-morpholine and p-phenylenediamine.

Heterocyclic type developer may include 3-pyrazolidones such as 1-phenyl-3-pyrazolidone, 1-phenyl-4,4-dimethyl-3-pyrazolidone and 1-phenyl-4-methyl-4-hydroxymethyl-3-pyrazolidone, abd 1-phenyl-4-amino-5-pyrazolone and 5aminouracil.

In the present invention, there may be effectively used the developers as described in T. H. James, "The Theory of the Photographic Process", Fourth Edition, pp. 291-334 and Journal of the American Chemical Society, Vol. 73, p. 3,100 (1951). These developers can be used either singly or in combination of two or more kinds, but preferably in combination of two or more kinds. Also, in the developing solution to be used for development of the light-sensitive material according to the present invention, for example, sulfites such as sodium sulfite and potassium sulfite can be used as the preservative without impairing the effect of the present invention. Also, as the preservative, hydroxylamine and hydrazide compounds can be used, and in this case, the amount of such compounds used may be preferably 5 to 500 g, more preferably 20 to 200 g per liter of the developing solution.

Also, in the developing solution, glycols may be contained as the organic solvent, and examples of such glycols may include ethylene glycol, diethylene glycol, propylene glycol, triethylene glycol, 1,4-butanediol and 1,5-pentanediol, but diethylene glycol may be preferably used. The amount of these glycols used may be preferably 5 to 500 g, more preferably 20 to 200 g per liter of the developing solution. These organic solvents can be used either alone or in combination.

The light-sensitive silver halide photographic material according to the present invention can give a light-sensitive material extremely excellent in storage stability by performing development processing by use of a developing solution containing a developing inhibitor as described above.

The pH value of the developing solution comprising the above composition may be preferably 9 to 13, but the pH value in the range of 10 to 12 is more preferred in preservability and photographic characteristics. As for the cations in the developing solution, a developer with higher potassium ion ratio than sodium ion is preferred for enhancing the activity of the developing solution.

The light-sensitive silver halide photographic material according to the present invention can be processed according to various conditions. The processing temperature may be preferably a developing temperature of 50° C or lower, particularly preferably around 25° C to 40° C, and the development is generally accomplished within 2 minutes, particularly preferably from 10 seconds to 50 seconds to bring about preferred effects in many cases. Also, other processing steps than developing, for example, washing, stopping, stabilizing and fixing, further, if necessary, pre-film hardening and neutralization can be employed as desired, and these can be also omitted suitably. Further, these treatments may be also the so-called manual development processing such as dish development and frame development, or mechanical development such as roller developing and hanger development.

The present invention is described in detail by referring to Examples. As a matter of course, the present invention is not limited by Examples as described below at all.

EXAMPLE 1

On a polyethylene terephthalate support applied to subbing treatment after corona discharging, followed further by corona discharging were coated an antistatic solution having the composition shown below while adding a hardener (H-1) shown below so as to become 10 ml/m² by using an air knife coater at a speed of 50 m/min.

| | |
|---|---|
| Water-soluble conductive polymer (A) | 60 g/l |
| Hydrophobic polymer particle (B) | 40 g/l |
| Ammonium sulfate | 0.5 g/l |
| Hardener (H-1) | 12 g/l |
| CH₃CH₂C(CH₂OCOCH₂CH₂N⊂⊃)₃ | |

The solution having the above composition was made 1 liter.

H-1 was added while coating.

The coating was dried under the parallel stream conditions of a drying air temperature of 90° C., an overall heat transfer coefficient of 25 Kg/m²·hr·° C. for 30 seconds, followed further by heat treatment at 140° C. for 90 seconds. On the antistatic layer, gelatin was coated to 2.0 g/m², and dried, followed by haze test. As the hardener of gelatin, the (H-2) shown below was employed.

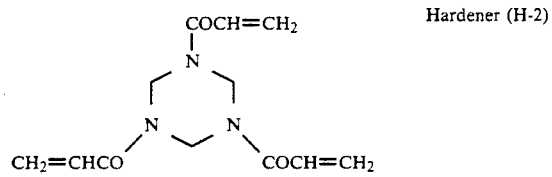

Hardener (H-2)

Haze Test

By means of a turbidimeter Model T-2600 DA manufactured by Tokyo Denshoku K.K., the film support was measured and the transmittance was represented in %.

The results are shown in Table 1.

TABLE 1

| | (A) | (B) | Transmittance (%) |
|---|---|---|---|
| This invention | 4 | 1 | 96 |
| This invention | 4 | 5 | 96 |
| This invention | 4 | 6 | 96 |
| This invention | 13 | 5 | 95 |
| This invention | 25 | 6 | 93 |
| Comparative | 4 | (a) | 80 |

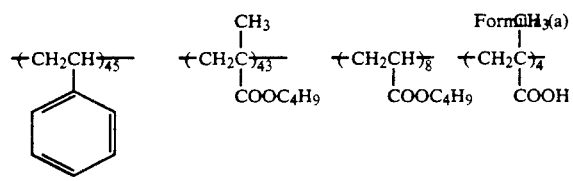

Compound disclosed in Japanese Unexamined Patent Publication No. 84658/1980

From the results in Table 1, it can be understood that the samples of the present invention are excellent in haze.

EXAMPLE 2

Under acidic atmosphere of pH 3.0, particles containing $10^{-5}$ mole of rhodium per one mole of silver were prepared according to the control double jet method. The particles were grown in a system containing 30 mg of benzyladenine per one liter of a 1% aqueous gelatin solution. After mixing of silver and a halide, 600 mg of 6-methyl-4-hydroxy-1,3,3a,7-tetrazaindene was added per 1 mole of silver halide, followed by washing and desalting.

Subsequently, 60 mg of 6-methyl-4-hydroxy-1,3,3a,7-tetrazaindene was added per one mole of silver halide, followed by sulfur sensitization. After sulfur sensitization, 6-methyl-4-hydroxy-1,3,3a,7-tetrazaindene was added as a stabilizer.

Silver Halide Emulsion Layer

To the above respective emulsions, the following additives were added by controlling the attached amounts to those shown below, and each mixture was coated on a polyethylene terephthalate support (thickness: 100 μm) subjected to subbing treatment using poly(styrene-butyl acrylateglycidyl methacrylate) latex.

| | |
|---|---|
| Latex polymer: styrene - butyl acrylate - acrylic acid terpolymer | 1.0 g/m² |
| Tetraphenylphosphonium chloride | 30 mg/m² |
| Saponin | 200 mg/m² |
| Polyethylene glycol | 100 mg/m² |
| Sodium dodecylbenzenesulfonate | 100 mg/m² |
| Hydroquinone | 200 mg/m² |
| Phenidone | 100 mg/m² |
| Sodium styrenesulfonate-maleic acid copolymer (Mw = 250,000) | 200 mg/m² |
| Butyl gallate | 500 mg/m² |
| Hydrazine compound shown below | 20 mg/m² |
| 5-Methylbenzotriazole | 30 mg/m² |
| 2-Mercaptobenzimidazole-5-sulfonic acid | 30 mg/m² |
| Inert osscein gelatin (isoelectric point 4.9) | 1.5 g/m² |
| 1-(p-Acetylamidophenyl)-5-mercaptotetrazole | 30 mg/m² |
| Silver quantity | 2.8 g/m² |
| Tetrazolium compound | |

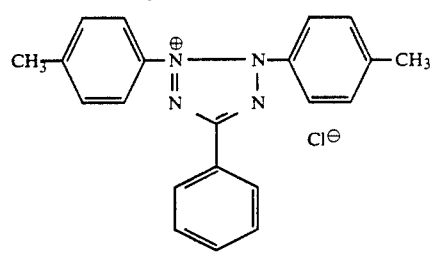

(Emulsion layer protective film)

As the emulsion layer protective film, the composition was prepared and coated to the attached amounts shown below.

| | |
|---|---|
| Fluorinated dioctylsulfosuccinic acid ester | 300 mg/m² |
| Matte agent: polymethyl methacrylate (average particle size 3.5 μm) | 100 mg/m² |
| Lithium nitrate | 30 mg/m² |
| Acid-treated gelatin (isoelectric point 7.0) | 1.2 g/m² |
| Colloidal silica | 50 mg/m² |
| Sodium styrenesulfonate-maleic acid copolymer | 100 mg/m² |
| Mordant: | 30 mg/m² |

-continued

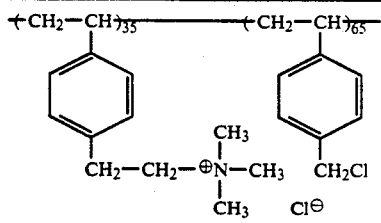

Dye: 30 mg/m²

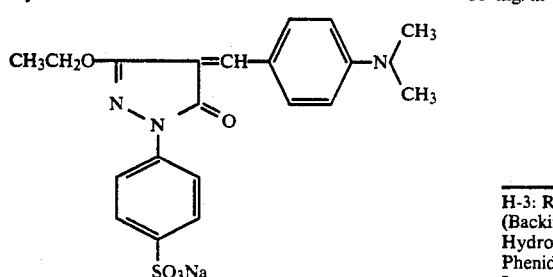

-continued (Backing layer)

On the support opposite to the emulsion layer, after corona discharging with a power of 30 W/m²·min previously, a poly(styrene-butyl acrylate-glycidyl methacrylate) latex polymer was coated in the presence of a hexamethyleneaziridine hardener, and further the antistatic layer of the present invention was provided by coating thereon over 10 hours in the same manner as in Example 1. Subsequently, a backing layer containing a backing dye having the composition shown below was coated on the layer. The gelatin layer was hardened with glyoxal, 1-oxy-3,5-dichloro-S-triazine sodium salt and the (H-3) shown below which is a hydroxy-containing epoxy compound.

| H-3: Reaction product of polyglycidol and epichlorohydrin (Backing layer) | |
|---|---|
| Hydroquinone | 100 mg/m² |
| Phenidone | 30 mg/m² |
| Latex polymer: butyl acrylate-styrene copolymer | 0.5 g/m² |
| Styrene-maleic acid copolymer | 100 mg/m² |
| Citric acid | 40 mg/m² |
| Benzotriazole | 100 mg/m² |
| Styrenesulfonic acid-maleic acid copolymer | 100 mg/m² |
| Lithium nitrate | 30 mg/m² |
| Backing dyes (a), (b) and (c) shown below | |
| Osccein gelatin | 2.0 g/m² |
| Backing dye (a) | 40 mg/m² |

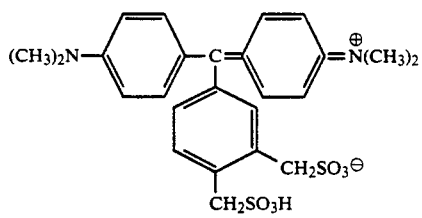

Backing dye (b)  30 mg/m²

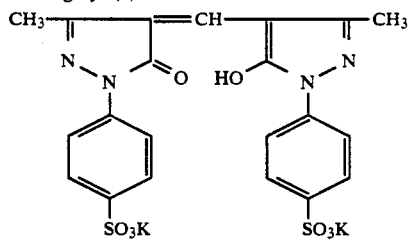

Backing dye (c)  30 mg/m²

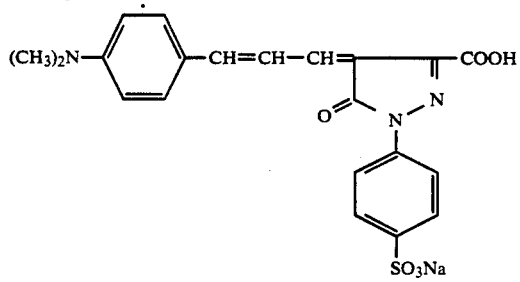

The samples obtained as described above were subjected to whole surface exposure, and developed by using the developing solution and the fixing solution shown below, followed by surface specific resistance test and haze test. The results are shown in Table 2.

Also, when the tetrazolium compound in the emulsion layer was replaced with the hydrazine compound shown below, the same effect could be obtained.

Hydrazine compound:

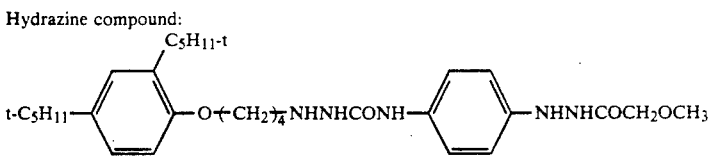

| <Developing solution recipe> | |
|---|---|
| Hydroquinone | 25 g |
| 1-Phenyl-4,4-dimethyl-3-pyrazolidone | 0.4 g |
| Sodium bromide | 3 g |
| 5-Methylbenzotriazole | 0.3 g |
| 5-Nitroindazole | 0.05 g |
| Diethylaminopropane-1,2-diol | 10 g |
| Potassium sulfite | 90 g |
| Sodium 5-sulfosalicylate | 75 g |
| Sodium ethylenediaminetetraacetate | 2 g |
| (made up to one liter with water, and adjusted to pH 11.5 with caustic soda) | |
| <Fixing solution recipe> | |
| (Composition A) | |
| Ammonium thiosulfate (72.5% by weight aqueous solution) | 240 ml |
| Sodium sulfite | 17 g |
| Sodium acetate.trihydrate | 6.5 g |
| Boric acid | 6 g |
| Sodium citrate.dihydrate | 2 g |
| Acetic acid (90% by weight aqueous solution) | 13.6 ml |
| (Composition B) | |
| Pure water (deionized water) | 17 ml |
| Sulfuric acid (50% by weight aqueous solution) | 3.0 g |
| Aluminum sulfate (aqueous solution containing 8.1% by weight content calculated on $Al_2O_3$) | 20 g |

During use of the fixing solution, the above composition A and the composition B were successively dissolved in 500 ml of water in this order, and made up to one liter before use. The fixing solution had a pH of about 5.6.

| <Developing processing conditions> | | |
|---|---|---|
| (Step) | (Temperature) | (Time) |
| Developing | 40° C. | 8 sec |
| Fixing | 35° C. | 8 sec |
| Washing | Normal temperature | 10 sec |

Measurement of Surface Specific Resistance

Measurement was conducted at 23° C. under 55% RH (relative humidity) by using a teraohmmeter Model VE 30 manufactured by Kawaguchi Denki K.K.

TABLE 2

| | (A) | (B) | Transmittance (%) | Surface specific resistance (Ω) |
|---|---|---|---|---|
| This invention | 4 | 1 | 95 | $5 \times 10^{11}$ |
| This invention | 4 | 5 | 84 | $6 \times 10^{11}$ |
| This invention | 4 | 6 | 95 | $5 \times 10^{11}$ |
| This invention | 13 | 5 | 95 | $5 \times 10^{11}$ |
| This invention | 25 | 6 | 92 | $5 \times 10^{11}$ |
| Comparative | 4 | (a) | 78 | $5 \times 10^{11}$ |

From the results in Table 2, according to the present invention, it can be understood that excellent antistatic ability can be maintained even after developing processing.

According to the present invention, an excellent antistatic layer of a light-sensitive silver halide photographic material excellent in transparency after coating could be obtained without any deterioration of antistatic ability even after developing processing.

We claim:

1. An antistatic layer formed on a plastic film to provide antistatic properties to the film, comprising:

a cured product of at least one kind of water-soluble conductive polymer obtained by curing said water-soluble conductive polymer with at least one curing agent, and wherein is contained (1) at least one kind of hydrophobic polymer particles having an amide group, and (2) at least one kind of salt of a strong acid and a weak base;

said conductive polymer having a styrene sulfonic acid group in an amount of 5% or more by weight, per molecule, of the conductive polymer, said hydrophobic polymer particles being in an amount sufficient to increase transparency of said antistatic layer, and being formed of monomers including a monomer represented by $$R-C(=CH_2)-(L)_a-CON(R_1)(R_2)$$

wherein
R is hydrogen or $C_1$-$C_4$ alkyl;
L is a divalent group;
a is 0 or 1;
$R_1$ is hydrogen or lower alkyl; and
$R_2$ is hydrogen or lower alkyl,
and at least one further monomer selected from the group consisting of styrene, styrene derivatives, alkyl acrylates, alkyl methacrylates, olefin derivatives, halogenated ethylene derivatives, acrylamide derivatives, methacrylamide derivatives, vinyl ester derivatives and acrylonitrile with the proviso that at least 30 mole % of the hydrophobic particles of the one further monomer is selected from the group consisting of said styrene derivatives, said alkyl acrylates and said alkyl methacrylates and wherein the ratio, in terms of % by weight, of the conductive polymer to the hydrophobic polymer particles to the curing agent is 50-95 to 5-45 to 1-45 and the amount of said water-soluble conductive polymer is 0.01 to 10 g/m²; and the amount of said salt is 0.1 to 20% by weight per said conductive polymer.

2. The antistatic layer of claim 1 formed by mixing the water-soluble conductive polymer with the hydrophobic polymer particles and the salt; and thereafter, coating the mixture onto the plastic film while adding the hardener to cure the water-soluble conductive polymer.

3. The antistatic layer according to claim 1, wherein a number average molecular weight of said water-soluble conductive polymer is 3,000 to 100,000.

4. The antistatic layer according to claim 2, wherein said molecular weight is 3,500 to 50,000.

5. The antistatic layer according to claim 1, wherein the water-soluble conductive polymer is contained in the antistatic layer in an amount of 0.5 g/m² to 2.5 g/m².

6. The antistatic layer according to claim 1, wherein the curing agent is a polyfunctional aziridine.

7. The antistatic layer according to claim 1, wherein the curing agent is a difunctional or trifunctional aziridine having a molecular weight of 600 or less.

8. The antistatic layer according to claim 1, wherein a pH of the layer is 8.5 or less.

9. The antistatic layer according to claim 1, wherein the salt is selected from the group consisting of ammonium sulfate, ammonium phosphate, ammonium hydrogen phosphate, ammonium dihydrogen phosphate, ammonium chloride, ammonium lactate and ammonium citrate.

10. The antistatic layer according to claim 1, wherein the water-soluble conductive polymer has at least one group selected from the group consisting of hydroxy group, amino group, epoxy group, aziridine group, active methylene group, sulfinic acid group, aldehyde group and vinylsulfone group in an amount of 5% by weight or more per one molecule of the water-soluble conductive polymer.

11. The antistatic layer of claim 1 wherein the cured product of the water-soluble conductive polymer is a water-insoluble cured product.

12. The antistatic layer of claim 1 wherein the cured product of the water-soluble conductive polymer is a water-insoluble cured product.

* * * * *